Aug. 1, 1944.    C. T. McGILL ET AL    2,354,694
VALVE AND AUTOMATIC OPERATING MECHANISM THEREFOR
Filed June 24, 1939    9 Sheets-Sheet 1

Inventors:
Chester T. McGill
& Omar Fred Dubuiel
By
McCanna, Wintercorn & Morsbach
Attys.

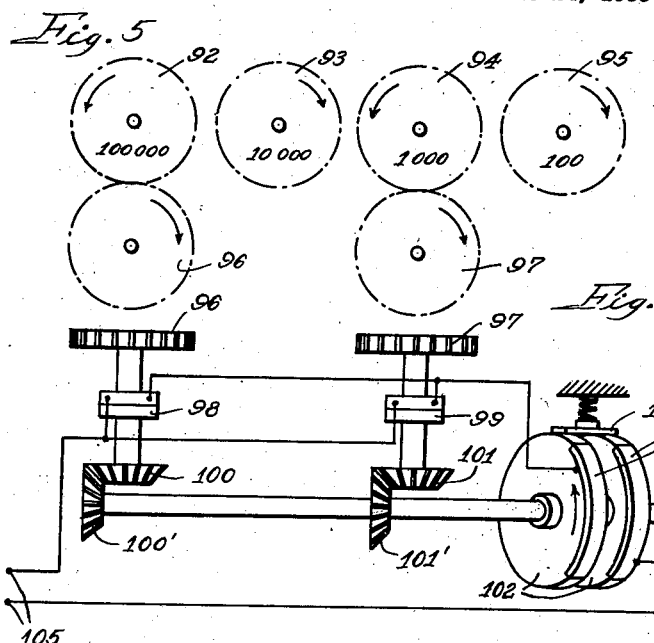
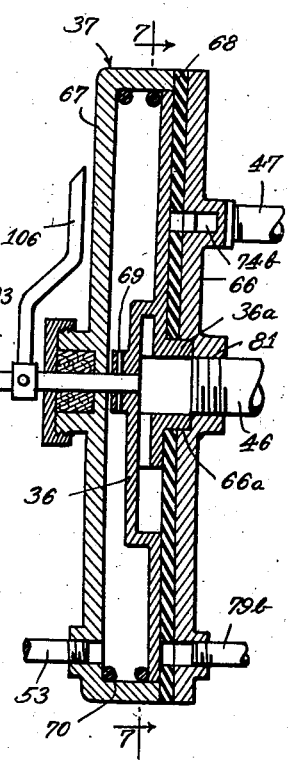
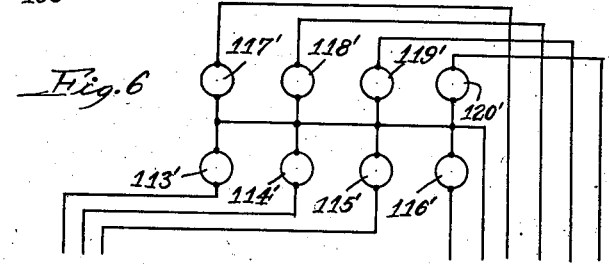
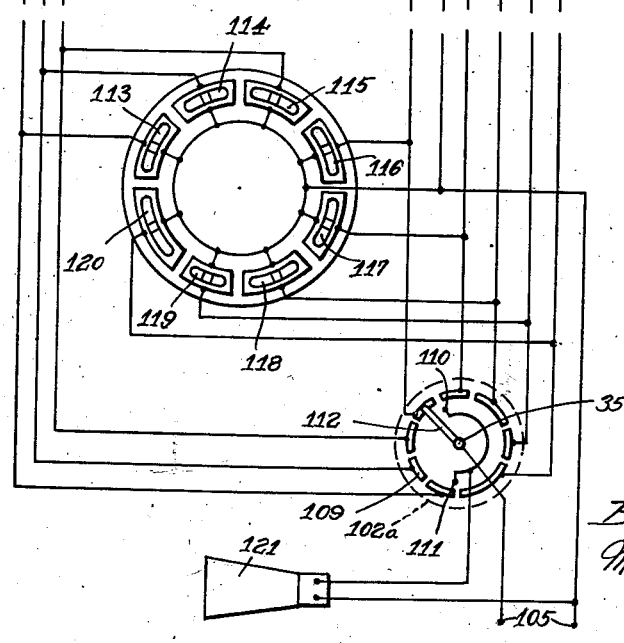

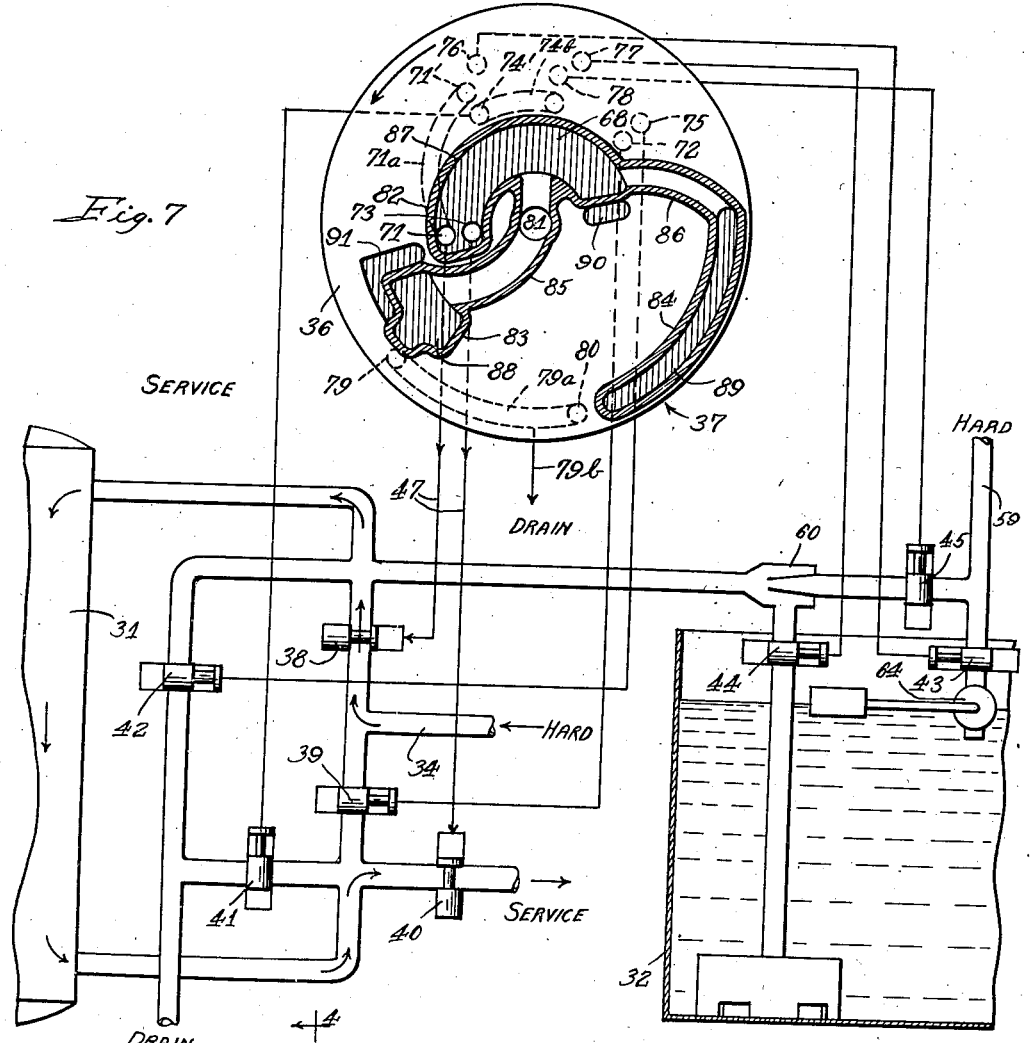
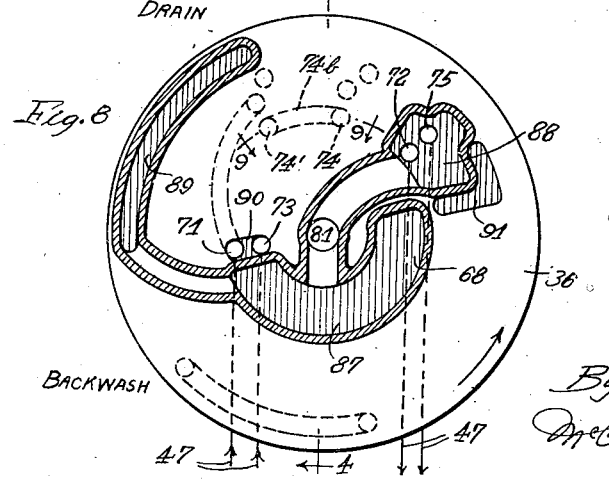
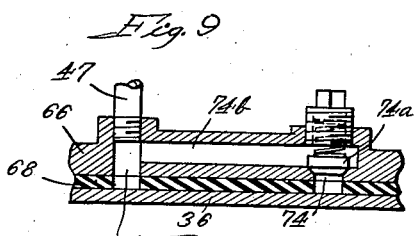

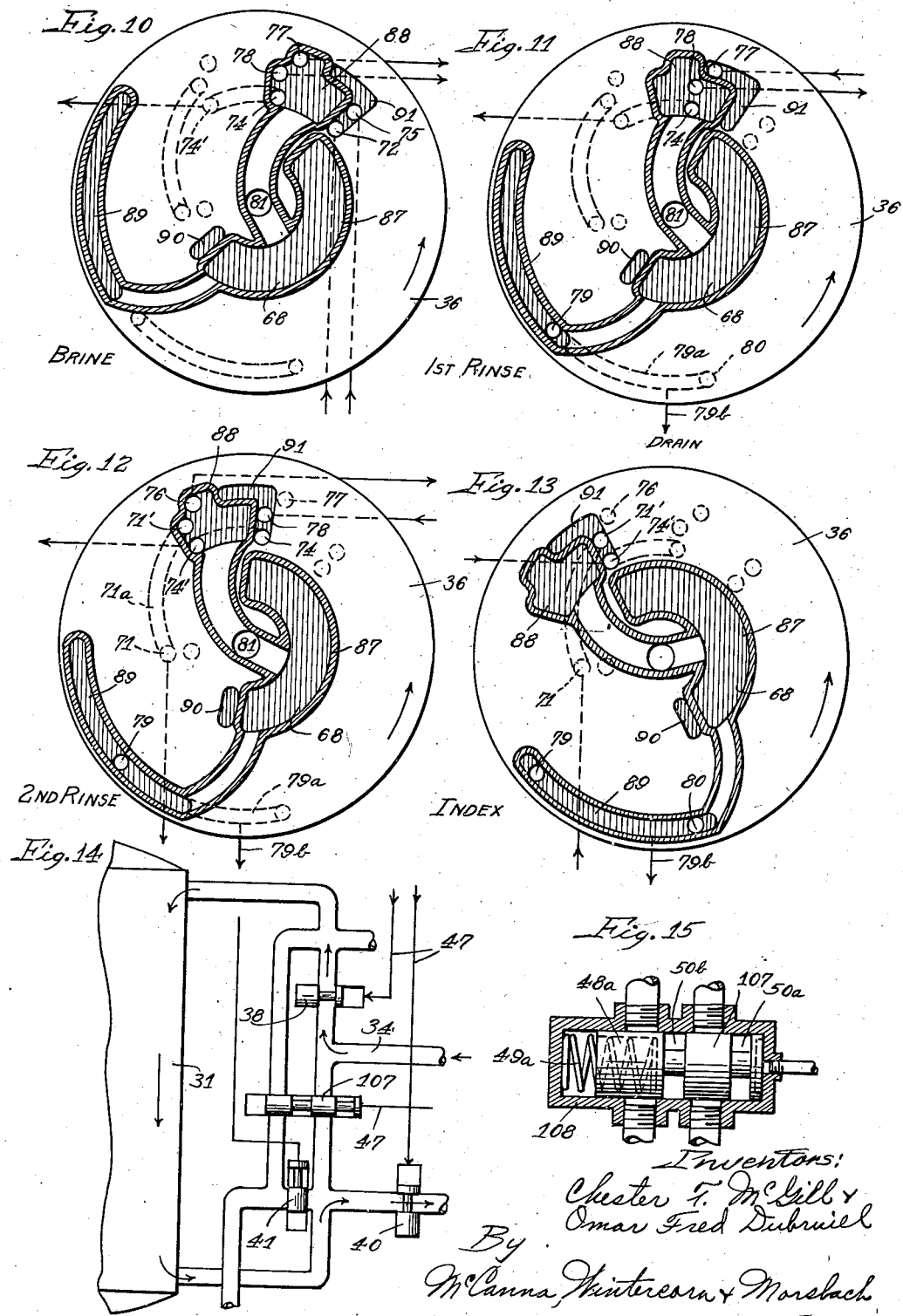

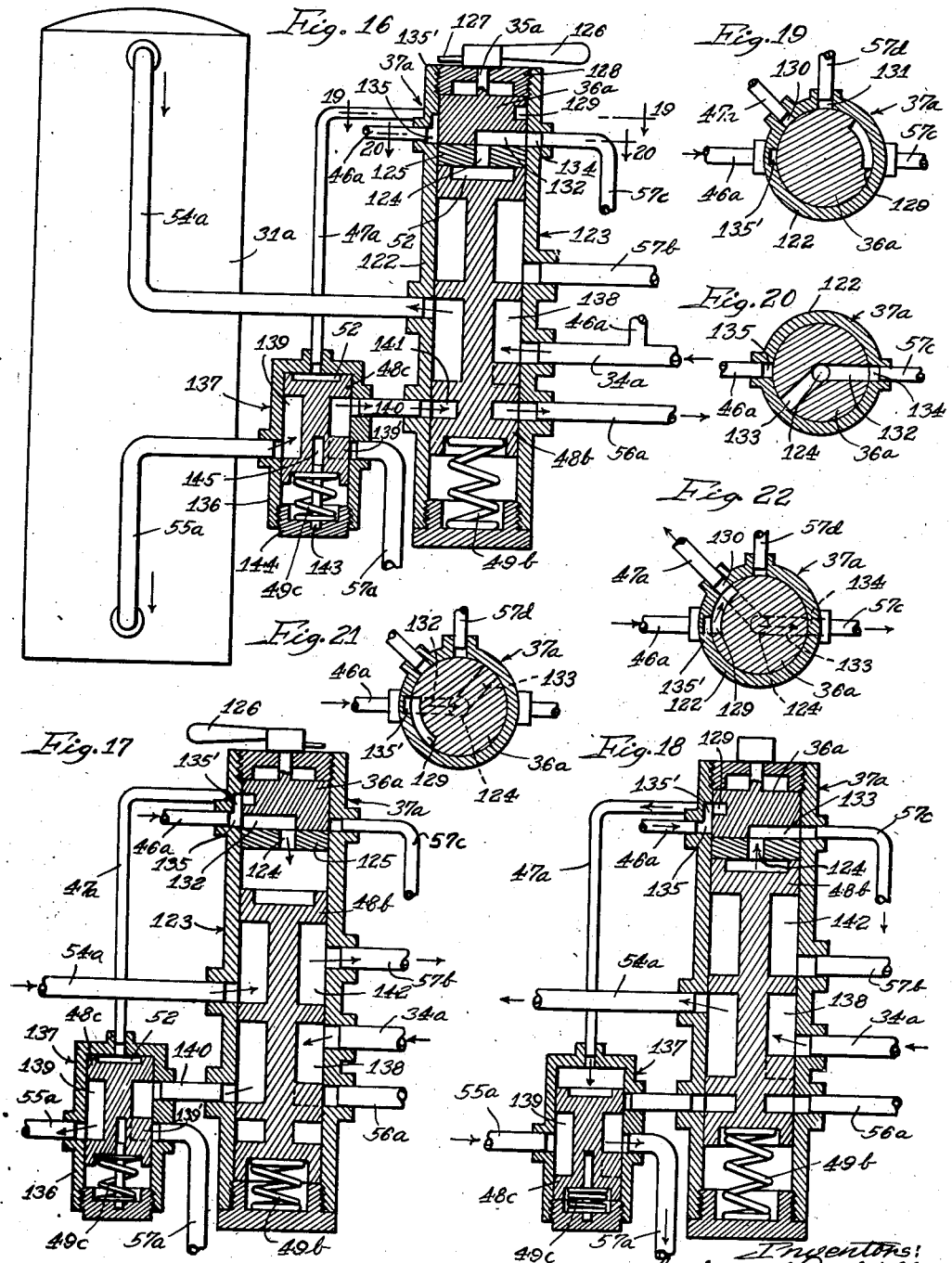

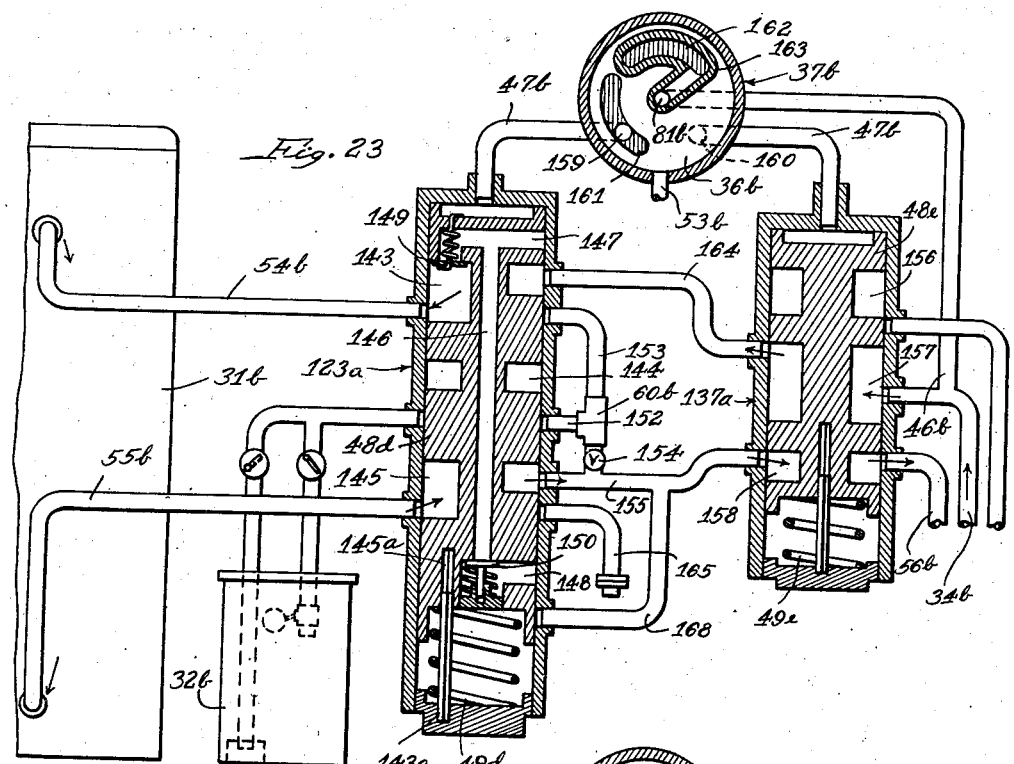
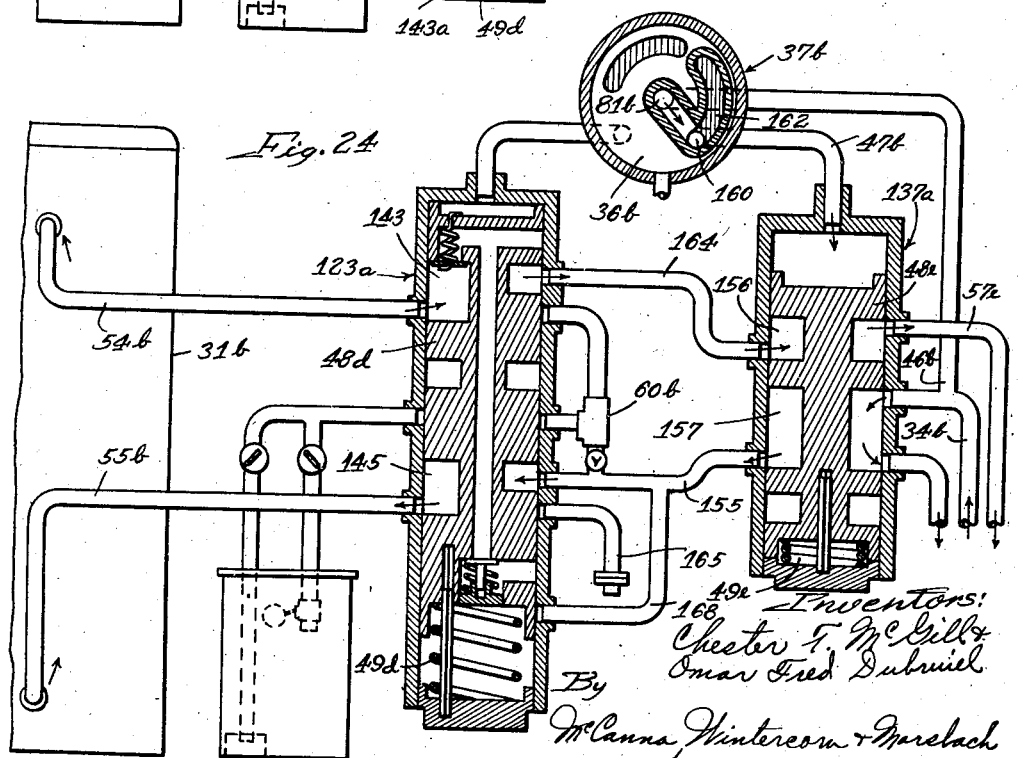

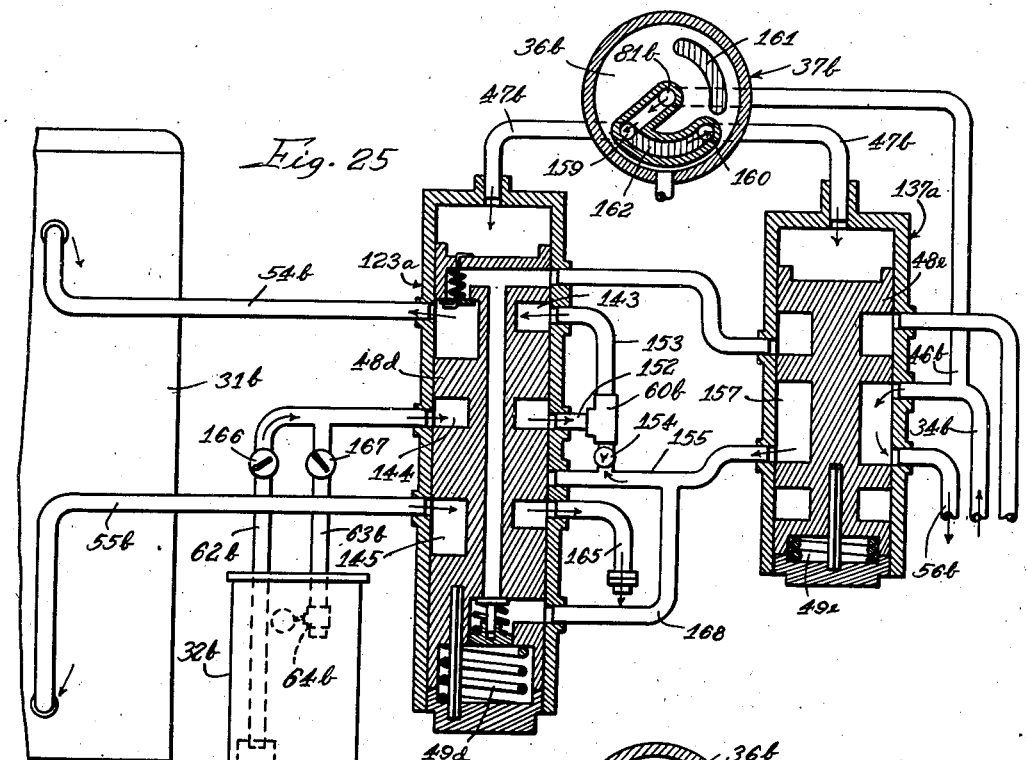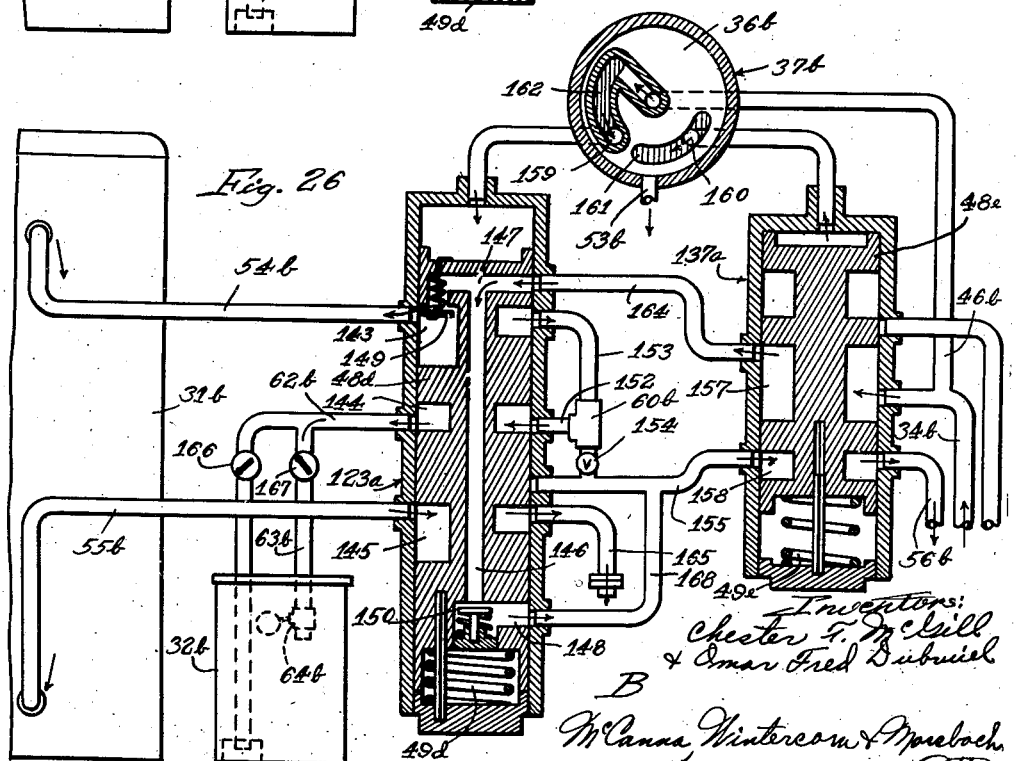

Aug. 1, 1944.   C. T. McGILL ET AL   2,354,694
VALVE AND AUTOMATIC OPERATING MECHANISM THEREFOR
Filed June 24, 1939   9 Sheets-Sheet 8
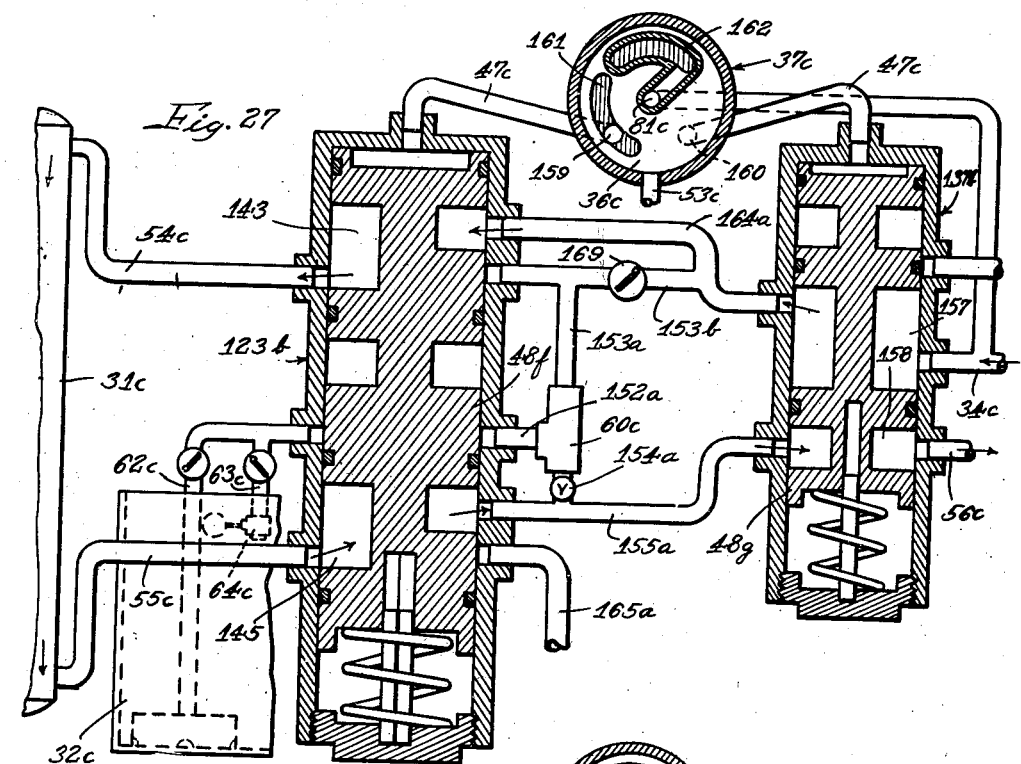
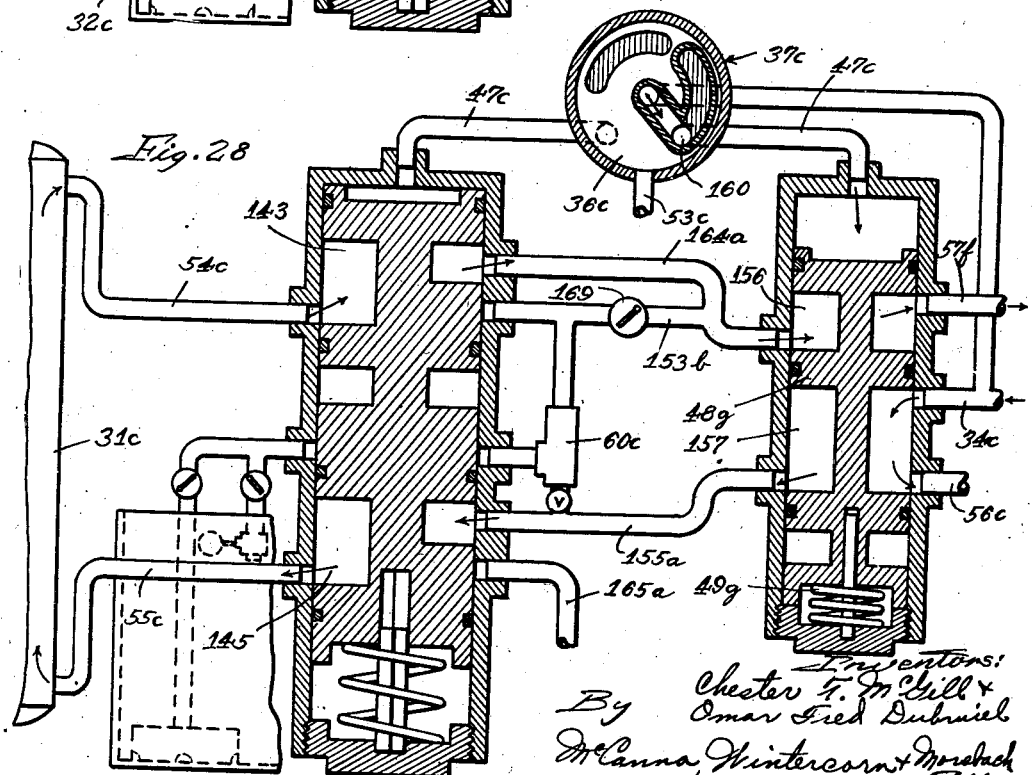
Inventors:
Chester T. McGill &
Omar Fred Dubruiel
By McCanna, Wintercorn & Morebach
Attys.

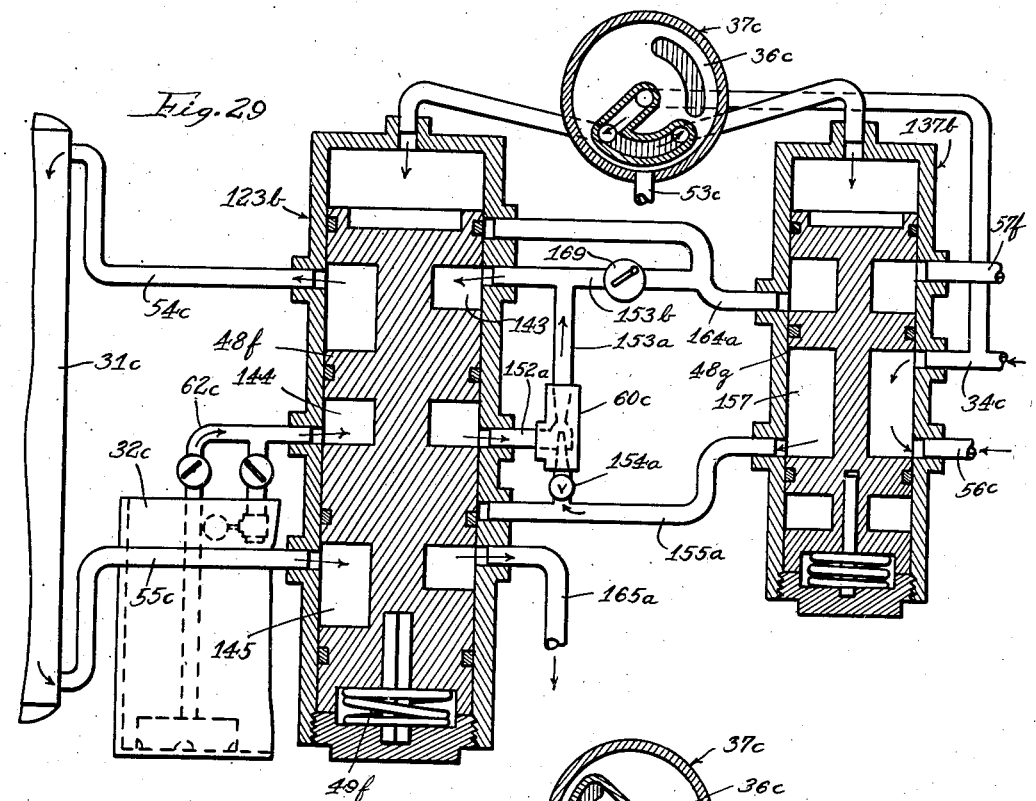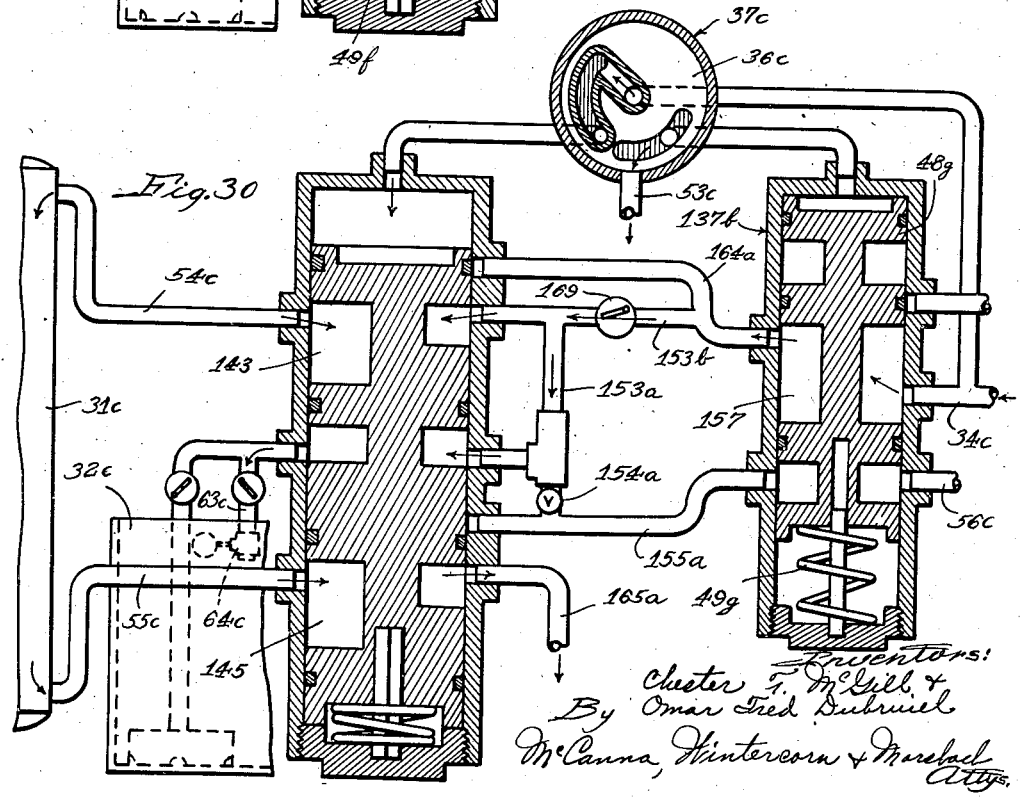

Patented Aug. 1, 1944

2,354,694

UNITED STATES PATENT OFFICE 2,354,694

VALVE AND AUTOMATIC OPERATING MECHANISM THEREFOR

Chester T. McGill and Omar Fred Dubruiel, Elgin, Ill., assignors to Elgin Softener Corporation, Elgin, Ill., a corporation of Illinois Application June 24, 1939, Serial No. 280,964

5 Claims. (Cl. 210—24)

This invention relates to valves and automatic operating mechanism therefor, especially designed and adapted for use with base-exchange water softeners, but also adapted for a variety of other uses, as, for example, with filters.

The principal object of our invention is to provide a system of valves in connection with a water softener, or filter installation, or the like, wherein a master control valve is continuously operated from the meter measuring the flow of water or other fluid through the unit so as to advance the valve proportionately as the unit is operated, whereby automatically to attend to the regeneration or reconditioning of the unit at or near the end of the capacity run, the master control valve so operated being connected with a plurality of servo-valves which in turn control the flow of water or other fluid through the unit so as to provide one system of connections for one course of flow during the capacity run and different systems of connections for different courses of flow through the unit during the different stages of regeneration.

Another important object of the invention consists in the provision of piston type servo-valves each having a pipe connection with the master control valve for application and release of pressure to operate these servo-valves at predetermined intervals in the cycle and in predetermined relation to one another, the pistons of the servo-valves being directly subjected to fluid pressure to move the same in the valve bodies against the action of return springs.

Another object is to provide piston type valves of the kind mentioned of multi-port construction whereby to reduce the number of pipe connections required and generally to simplify installations.

The invention is illustrated in the accompanying drawings, in which—

Fig. 1 is a front view of a water softener and brine tank having a plurality of piston type servo-valves for controlling the flow of water and brine through the softener, in accordance with our invention, the valves being controlled by a master control valve having pipe connections with the bodies of said valves for fluid pressure actuation thereof and the master valve being operated continuously from the meter measuring the flow of water through the softener, in accordance with our invention;

Fig. 4 is a diagrammatic view illustrating the operation of the master control valve from the meter;

Fig. 5 is a face view of the register gears of the meter appearing in side elevation in Fig. 4;

Fig. 6 is an electrical wiring diagram showing our improved signaling means to indicate the extent of exhaustion of the unit or the progress of regeneration thereof;

Fig. 7 is a diagram showing the water flow through the softener of Fig. 1 during softening, the master control valve being shown in section on the line 7—7 of Fig. 4;

Fig. 8 is a sectional view of the master control valve in backwash position;

Fig. 9 is a sectional detail on the line 9—9 of Fig. 8;

Figs. 10 to 13 are other sectional views similar to Fig. 8 of the master control valve in other positions;

Fig. 14 is a diagram similar to Fig. 7, but showing a modified or alternative construction;

Fig. 15 is a sectional detail of a multi-port servo-valve forming a part of the installation shown in Fig. 14;

Fig. 16 is a diagrammatic front view of a filter employing two multi-port servo-valves in combination with a master control valve to control the flow of water therethrough;

Figs. 17 and 18 are two other views of the valves in moved positions;

Figure 1:
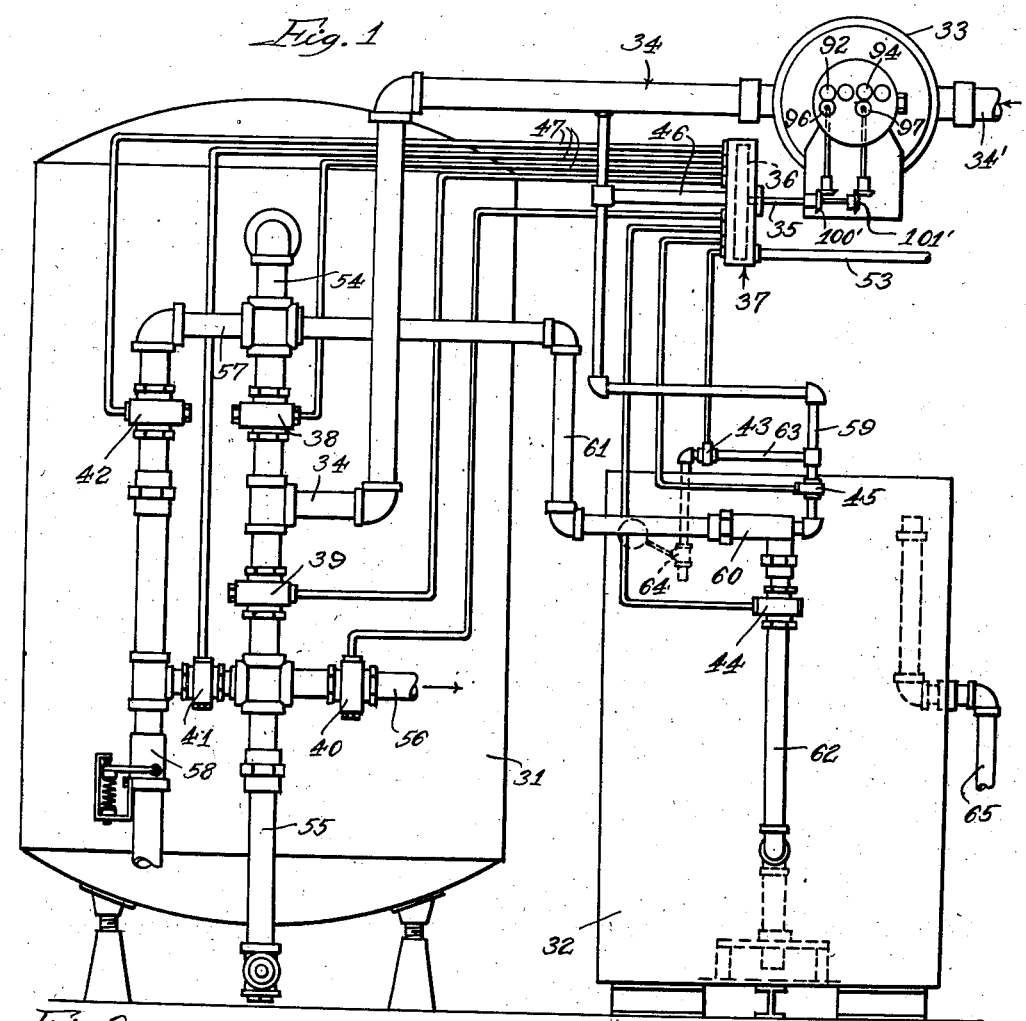
Figure 2:
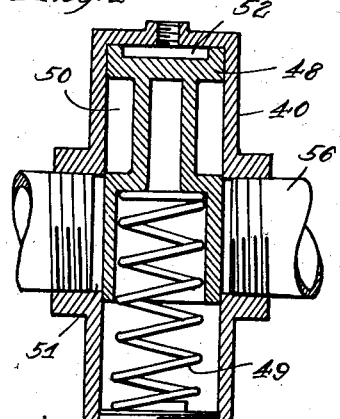
Figs. 2 and 3 are sectional views of one of the servo-valves, showing the piston thereof in normal retracted position in Fig. 2 and in pressure actuated position in Fig. 3.

Figs. 19 and 20 are cross-sections of the master control valve, on the lines 19—19 and 20—20 of Fig. 16;

Figs. 21 and 22 are other sections like Fig. 19, but showing the valve turned to the positions of Figs. 17 and 18, respectively, and showing in dotted lines the moved positions of the ports that appear in the section Fig. 20;

Fig. 23 is a diagrammatic front view of another softener installation showing the use of two multi-port servo-valves in combination with a master control valve;

Figs. 24, 25 and 26 are views similar to Fig. 23, but showing the valves in moved positions for different steps of the regeneration cycle, and Figs. 27 to 30 are views corresponding to Figs. 23 to 26, respectively, but illustrating multi-port servo-valves of a different construction.

Similar reference numerals are applied to corresponding parts throughout the views.

Before describing our invention, we desire to point out that while the following description has reference to water softeners and/or filters, it should be understood that we do not limit the application of our invention to that field, inasmuch as our systems of valves and controls therefor may be used in many other kinds of units where, instead of water, other fluids and gases or air may be the fluid medium, the flow of which is to be controlled by the valve mechanism. For that reason, although the valves herein described, where applied to softeners, are designed to take care of four operations, namely, softening, backwashing, brining and rinsing, and, where applied to filters, are designed to take care of three operations, namely, filtering, backwashing and rinsing, our invention is not limited to these particular operations or numbers of operations, inasmuch as different circuits may be established to suit different needs by simple changes and additional connections in the master control valve and servo-valves. Those skilled in different arts will at once appreciate further applications of the invention which space does not permit our illustrating and describing here. The particular embodiments disclosed are, in other words, simply examples of the uses to which our invention may be put.

Figure 3:
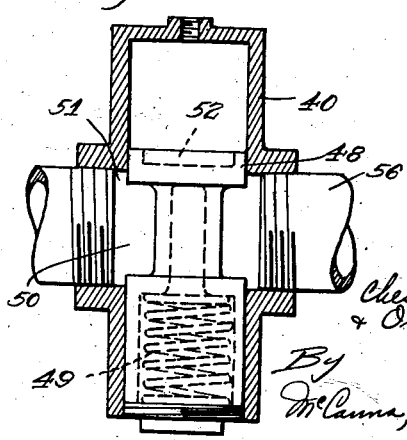

Referring first to Figs. 1 to 3, 31 designates a base-exchange water softener and 32 the brine tank therefor. At 33 is indicated a meter in the raw water supply line 34 to measure all of the water delivered to the softener during the capacity run as well as all of the water used during the backwashing, brining and rinsing stages of regeneration. In accordance with our invention, the meter 33 is arranged to transmit drive continuously to the shaft or stem 35 to turn the rotor 36 of the master control valve 37, whereby to control the opening and closing of a plurality of piston type servo-valves numbered 38 to 45 associated with the softener 31 and brine tank 32 for controlling the flow of water and brine through the softener. The rotor 36 is a disk having ports extending therethrough in circumferentially spaced relation on different radii, as indicated at 90 and 91 in Fig. 7, and having a central port 81 and other ports 87, 88, and 89 interconnected by passages with the central port 81, as clearly indicated in Fig. 7. The pipe indicated at 46 delivers water under pressure from the supply pipe 34 to the master control valve 37, and, depending upon the position of the rotor 36, pipes 47 conduct the water to the valves numbered 38 to 45 to shift the annularly grooved pistons 48 thereof from one position to another against the action of return springs 49. Thus, in the case of valve 40 shown in Figs. 2 and 3, the piston 48 thereof is held normally in a raised closed position with the annular groove 50 out of communication with the diametrically opposed ports 51, but when pressure is delivered to the circularly recessed upper end 52 of the piston 48, the piston 48 is forced downwardly against the action of the spring 49 to open position, as shown in Fig. 3, wherein the annular groove 50 communicates with the ports 51. It will be apparent that while this particular valve is normally colsed and is arranged to be opened, other valves operating on the same principle may be provided which are normally open, but upon admission of pressure fluid to actuate the piston are arranged to be closed. Of course, just as soon as the pressure which actuated the piston 48 is relieved, the spring 49 returns the piston to its normal position. A pipe 53 is shown extending from the master control valve 37 leading to the sewer or other drain receptacle, and this pipe in certain positions of the rotor 36 communicates with certain of the pipes 47 associated with certain of the valves 38—45 to release the actuating pressure therefrom.

The operation is as follows: During softening operation, valves 38 and 40 are held open under hydraulic pressure and valves 39 and 41 to 45 are left closed. The incoming raw water from pipe 34 flows through valve 38 and pipe 54 into the top of the softener 31 for passage downwardly through the bed of water softening material, whereby to be softened. The outgoing softened water is conducted from the bottom of the softener 31 through pipe 55 and flows through the valve 40 to the service system through pipe 56. At the end of the capacity run, the meter 33 which has meanwhile been continuously turning the rotor 36 of the master control valve 37 in one direction, has advanced the rotor 36 to a backwash position where only valves 39 and 42 are opened, all of the other valves of group 38—45 being closed. During backwash, the incoming raw water from pipe 34 is conducted downwardly from the open valve 39 into the bottom of the softener 31 for passage upwardly through the bed of water softening material, so as to break up the bed and remove from the top thereof all scum and sediment deposited there during the softening operation. The waste water leaves the top of the softener 31 through pipe 54 and is conducted through pipe 57 through the open valve 42 and through a regulating valve 58 to the sewer or other waste receptacle. The regulating valve 58 is preferably of the type disclosed in the copending application of Chester T. McGill, Serial No. 190,660, filed February 15, 1938, and is designed to maintain a predetermined uniform flow regardless of pressure variations in the line, and avoid water hammer. After a predetermined amount of water has been passed through the softener, sufficient to thoroughly break up the bed of water softening material and remove sediment and impurities, the meter 33 which has meanwhile continued to turn the rotor 36, turns the rotor 36 to brining position in which only valves 41 and 45 are opened, and, soon thereafter, also valve 44. Under these conditions, when valves 41 and 45 are open, raw water is delivered from the supply pipe 34 through pipe 59 through the open valve 45 and through an ejector 60 into the pipe 61 communicating with the pipe 54 connected to the top of the softener 31. The rush of raw water through the ejector 60 causes a suction and, when the valve 44 is opened, brine is drawn through pipe 62 and mixes with the water delivered through pipes 61 and 54 into the top of the softener 31. The brine mixture flowing downwardly through the bed of water softening material regenerates the material and liberates the calcium and magnesium deposited therein during the softening operation. The outgoing spent brine is conducted through pipe 55 from the bottom of the softener 31 and flows through the open valve 41 out to the drain through the regulator valve 58. The meter 33 meters the brine indirectly by measuring the amount of water allowed to flow through the ejector 60 before the valve 44 is closed to cut off further delivery of brine to the ejector from the brine tank 32. When the valve 44 is closed, the raw water flow is continued from pipe 59 into the top of the softener 31 through valve 45 and ejector 60, during what we term the "first rinse," in order to rinse out the brine and liberated calcium and magnesium. The meter 33 here again measures the amount of rinse water used during the first rinse. A second rinse follows when the meter 33 in the advancement of the disk 36 during the first rinse brings it to a position where the valve 45 is allowed to close but valve 41 is allowed to remain open and valves 38 and 43 are opened. This second rinse flow is at a much faster rate than the first rinse flow during which the ejector 60 constitutes a restriction in the line. In fact the second rinse flow is at about the same rate as the backwash flow. With valves 38 and 41 opened, raw water is delivered from the supply pipe 34 into the top of the softener 31 for passage downwardly through the bed of water softening material and out to the drain through the valve 41. At the same time, since the valve 43 is opened, there is a flow of raw water from the supply pipe 34 into the brine tank 32 to restore the normal level therein, the flow into the brine tank being shut off automatically by the float valve 64. During the course of the second rinse flow, the valve 43 is allowed to close, inasmuch as it does not take so long to replenish the water supply in the brine tank 32. The pipe shown at 65 is an overflow pipe for the brine tank 32 which serves to conduct any surplus water to the drain in the event the float valve 64 fails to close when the correct predetermined level is attained, prior to the closing of the valve 43. The second rinse flow is, of course, also measured by the meter 33 and the latter advances the disk 36 of the master control valve 37 during this second rinse, and when a predetermined amount of rinse water has been passed through the softener 31, the valves 38 and 41 are allowed to close. This completes the regeneration cycle and the only thing remaining is to get the rotor 36 of the master control valve 37 indexed back to softening position, and it will soon appear how we have provided for flow to the drain after the second rinse operation, so that the meter 33 can advance the rotor 36 to softening position.

The master control valve 37 is better illustrated in Figs. 4, and 7 to 13. In addition to the metallic rotor 36 operated by the shaft 35, the valve 37 comprises a metallic stator or base member 66, metallic cover 67 and intermediate ported gasket 68 of rubber, composition, or other suitable non-metallic material, the cover 67 being suitably secured to the base 66 and clamping the gasket member 68 therebetween. The rotor 36 has a tubular axial pilot extension 36a received in a pilot bearing 66a provided in the center of the stator to insure accurate port alignment between the rotor and stator. The shaft 35 is suitably connected with the rotor 36, as indicated at 69. A coiled compression spring 70 acting between the rotor 36 and cover 67 holds the rotor seated under medium pressure. The stator 66 and gasket 68 have registering circumferentially spaced ports, numbered 71 to 80, provided therein. The port 71 is connected with the valve 38 for hydraulic operation of the piston thereof, as indicated at 47 in Fig. 7, and in the same figure are indicated other lines from other of the ports mentioned extending to valves 39, 40, 41, 42, 43, 44, and 45 for a similar purpose. 81 is the central port to which the pipe 46 is connected for delivering water to the rotor 36. There are three hollow arcuate bosses 82, 83 and 84 provided on the rotor 36 interconnected by hollow bosses 85 and 86 with one another and with the central supply port 81. The bosses 82, 83, and 84 define rotor ports 87, 88 and 89, respectively, through which water is arranged to be delivered under pressure from the raw water supply port 81 to whatever ports of the series 71—80 in the stator happen to be in register with one or more of these three rotor ports at any given time. Two other ports 90 and 91 are provided in the rotor 36, and these may be considered as relief ports, inasmuch as they serve to establish communication with the drain pipe 53 for whatever stator ports happen to register with these two rotor ports at any given time in the turning of the rotor. The rotor ports 87 and 90 are on a common radius and during one portion of a revolution of the rotor 36, the ports 71 and 73 register with the port 87, as in Fig. 7, but at another point they register with the port 90, as in Fig. 8. Rotor ports 88 and 91 are on a common radius and at one point in a revolution of the rotor 36, port 88 registers with stator ports 72 and 75, as in Fig. 8, but soon thereafter the rotor port 91 comes into register with the stator ports 72 and 73, as shown in Fig. 10. Three other ports in the stator, namely, 74, 76 and 77 are likewise in the path of the rotor ports 88 and 91, all three of these ports registering with the rotor port 88 in Fig. 10. Ports 74 and 76 are opened first and then port 77 so that valves 41 and 45 are opened before valve 44, valves 41 and 45 being controlled by ports 74 and 76, and valve 44 by port 77. Three other stator ports 74', 71' and 76 are arranged to register with the rotor ports 88 and 91 in the same manner and order, as clearly illustrated in Figs. 12 and 13. The stator ports 74 and 74' are on a common radius and the port 74 has a spring actuated check valve 74a provided therein, as illustrated in Fig. 9, so that when pressure is supplied to the port 74', as in Fig. 12, the check valve 74a will prevent discharge of water to the drain through port 74, although when the port 74 is in register with the rotor port 88, as in Fig. 10, water under pressure will open the check valve 74a and deliver water through the passage 74b to the pipe 47 that extends from the port 74' to the valve 41 (see Fig. 7). The stator ports 71 and 71' are on different radii but interconnected by the passage 71a, port 71 being arranged to register with rotor ports 87 and 90 in different positions of the rotor, and port 71' being arranged to register with rotor ports 88 and 91 in different positions of the rotor. The rotor port 89 is arranged to register with either one or both of the stator ports 79 and 80, port 79 being shown in register with the rotor port 89 in Figs. 11 and 12 and ports 79 and 80 being both shown in register with rotor port 89 in Fig. 13. The stator ports 79 and 80 are interconnected by a passage 79a and, as indicated at 79b in Fig. 7, this passage has a pipe extending therefrom to the sewer or other drain receptacle. The meter 33 is arranged to turn the rotor 36 continuously in one direction, and it is for that reason that the bosses 82, 83, and 84 are elongated circumferentially, the thought being to maintain communication between the rotor port 87 and the stator ports 71 and 73, for example, until a predetermined amount of water has passed through the meter before that communication is interrupted and a different system of communication established through the rotor and stator. While we have shown a rotor 36 with bosses 82, 83, and 84 of fixed circumferential length or angular extent, it should be understood that we do not limit our invention to such a construction, but contemplate providing a desired degree of adjustability to suit the requirements of different installations where the softeners or filters have different capacities. On the other hand, we may provide interchangeable rotors 36 with bosses 82, 83, and 84 provided for application of the master control valve to each of a series of softeners or filters of different capacities, these bosses being of certain sizes for one capacity and certain other sizes for another capacity.

The shaft 35 for turning the rotor 36 of the master control valve 37 is arranged to be turned by the meter at a comparatively slow speed during the capacity run and at a much faster speed during the regeneration period. At 92—95 in Fig. 5 are indicated register gears of the meter 33 for 100,000 gallons, 10,000 gallons, 1,000 gallons and 100 gallons, respectively. The 100,000 gallon gear 92 turns 1/100 the speed of the 1,000 gallon gear 94, and throughout the capacity run the slow gear 92 is arranged to transmit drive to the shaft 35 through the gear 96, whereas, during regeneration, the shaft 35 is arranged to be driven at a much faster speed from the gear 94 through an intermediate gear 97. The gears 96 and 97 turn in the same direction and have electromagnetic clutches 98 and 99 through which they are arranged to be connected with or disconnected from bevel gears 100 and 101 that are constantly meshed with other bevel gears 100' and 101' on the shaft 35. Now, the clutch 98 is of the reverse type from clutch 99, the clutch 98 being normally engaged but arranged to be disengaged upon energization of its coil, whereas the coil 99 is normally disengaged and arranged to be engaged upon energization of its coil. Two disks 102 of insulating material turn with the shaft 35 and carry contacts 103 on the periphery thereof arranged to be interconnected by a stationary bridge piece 104 that rides on the periphery of the disks under spring pressure, whereby to simultaneously energize the coils of both clutches 98 and 99 from the source of electric current supply 105. Inasmuch as one complete turn of the shaft 35 accounts for the capacity run and the regeneration cycle, and it is only during the regeneration cycle that the shaft 35 is to be driven at the higher speed from gear 97, thus necessitating the energization of the coils for clutches 98 and 99 only during that portion of the turn of the shaft 35, the contacts 103 are provided of a predetermined length circumferentially of the disks 102 so as to come into engagement with the bridge 104 at the end of the capacity run and move out of engagement therewith at the end of the regeneration cycle. There is therefore no current flow during the long period of normal softening operation which we refer to as the capacity run. All during that period the gear 96 is clutched to the gear 100 and the gear 97 is in declutched relation to gear 101, so that the shaft 35 turns at the slow rate of the 100,000 gallon register gear 92 of the meter. It will be understood that while we have referred to the drive take-off from the meter as involving the register gears, we may utilize other intermediate gears in the meter to transmit drive to the shaft 35. In Fig. 4, the parts are shown in positions corresponding to the end of the capacity run with the valve 37 appearing in section on the line 4—4 of Fig. 8. The pointer 106 turning with the shaft 35 relative to the cover 87 indicates by its relation to markings on the cover the position of the valve at any given time.

The operation may be understood by reference to Figs. 7 to 13. Fig. 7 illustrates softening operation, and in this figure, ports 71 and 73 are the only ports exposed and they register with the rotor port 87. Water under pressure is therefore delivered through these ports 71 and 73 from the supply port 81 to open valves 38 and 40 and to hold them open so long as these stator ports are in communication with the rotor port 87. Water from the hard water supply line 34 is accordingly delivered to the top of the softener 31 and flows downwardly therethrough to be softened, and the softened water leaving the bottom of the softener flows out through the open valve 40 to the service system. The meter 33 measures the flow of raw water to the softener to be softened and continuously advances the rotor 36 in a counterclockwise direction, as indicated by the arrow in Fig. 7. At the end of the capacity run, stator ports 72 and 75 come into register with rotor port 88 and the stator ports 71 and 73 come into register with the rotor port 90, thereby opening valves 39 and 42 and closing valves 38 and 40 for the backwash operation illustrated in Fig. 8. By the direction of the arrows on the lines extending to the stator ports 71 and 73, we have indicated release of pressure from the pistons of valves 38 and 40. On the other hand, the arrows on the lines extending from stator ports 72 and 75 indicate application of pressure to the pistons of valves 39 and 42. Then by reference to Fig. 7, assuming valves 39 and 42 are opened and the other valves are closed, it is clear that the incoming raw water from the supply pipe 34 enters the bottom of the softener 31 and flows upwardly therethrough and out to the drain through the valve 42. This flow continues until a predetermined amount of water has passed through the softener, measured by the meter 33. During this operation, the meter continuously advances the rotor 36 in a counter-clockwise direction but at a much faster rate than during softening operation, it being understood from the previous description of Fig. 4 that at the commencement of the regeneration cycle the contacts 103 complete a circuit through the coils of clutches 98 and 99 so as to disconnect gear 96 from the shaft 35 and connect gear 97 thereto to drive the rotor 36 one hundred times faster during the regeneration cycle than during softening. The faster movement of the rotor holds true for Figs. 8, 10, 11 and 12, whereas the slower movement of the rotor holds true for Figs. 7 and 13, according to the length of the contacts 103 previously described. At the end of the backwash, stator ports 72 and 75 come into register with rotor port 91 and first stator ports 74 and 76 come into register with rotor port 88, and shortly thereafter the port 77 also, as shown in Fig. 10. This figure illustrates the brining operation, and under these conditions the valves 39 and 42 are closed by release of pressure from their pistons through ports 72 and 75, as indicated by the arrows. Valves 41 and 45 are opened by reason of water under pressure being delivered through ports 74 and 76. Then the valve 44 is opened by water delivered through port 77. Raw water from the pipe 59 is discharged through the ejector 60 into the top of the softener and entrains with it brine from the brine tank 32 and the brine mixture flows downwardly through the softener 31 to regenerate the water softening material therein, the spent brine leaving the bottom of the softener and flowing to the drain through the open valve 41, as should be clear in Fig. 7, knowing that valve 41 during brining operation is the only one of the five in the one group opened and that valves 44 and 45 are also opened. The port 77 soon comes into register with rotor port 91, as shown in Fig. 11, thus relieving the pressure from the piston of valve 44 and allowing this valve to close and cut off the flow of brine so that only raw water flows through the bed thereafter in what we call the "first rinse." The fact that the meter measures the flow of water during the brining operation and causes the brine valve 44 to close when a predetermined amount of water has passed through the meter, results in accurate measurement of the amount of brine used. The first rinse operation is illustrated in Fig. 11 and it is clear that valves 45 and 41 remain open, due to the continued registration of stator ports 74 and 78 with the rotor port 88. The flow through the softener 31 during this first rinse is fairly slow due to the restriction imposed by the ejector 60. During this first rinse operation, a drain port 79 also comes into register with the rotor port 89, thus relieving some of the pressure and accordingly cutting down the rate of flow during the first rinse. At the end of the first rinse, the second rinse starts, which is illustrated in Fig. 12. The valve 45 is allowed to close by reason of the uncovering of port 78 by rotor port 91 and at the same time ports 74', 71', and 76 come into register with rotor port 88. This results in the opening of valve 43, which is identified with port 76, and the opening of valve 38, which is identified with interconnected ports 71 and 71', the valve 41 remaining open by reason of its connection with port 74'. In this second rinse, a much faster flow is obtained, the raw water from the supply pipe 34 passing through the open valve 38 and entering the top of the softener 31 and flowing downwardly therethrough and out to the drain through the valve 41. At the same time, raw water from the pipe 59 is delivered through the open valve 43 and float valve 64 into the brine tank 32, the float valve 64 serving to shut off the flow as soon as a predetermined level is attained. The stator port 76 is soon placed in communication with the rotor port 91, as should be clear from an inspection of Fig. 12, so that the valve 43 will be allowed to close shortly after the float valve 64 shuts off flow into the brine tank. It will be noticed in Fig. 12 that throughout the second rinse, the stator port 79 remains in register with the rotor port 89 to conduct water to the drain, so that there is ample opportunity to replenish the water supply in the brine tank from this source. The amount of water used for the second rinse is measured by the meter 33 which advances the rotor 36 while the water is delivered to the softener. Finally, ports 71' and 74' are uncovered by rotor port 91, as shown in Fig. 13, and the valves 38 and 41 are closed, so that the only further flow of water through the meter is that permitted through stator ports 79 and 80 to the drain. In that way, the rotor 36 is arranged to be indexed back to the softening position shown in Fig. 7. In the case of a single softener installation, the duration of flow to the drain following completion of the second rinse will be shortened considerably over what is provided for in the present construction, it being evident from a comparison of Figs. 7 and 13 that the rotor 36 must travel through approximately 90° to reach softening position. The only object in illustrating this long travel here is to indicate the flexibility of application of the invention for use with different installations. Thus, in the case of an installation having two or more softeners, where it is necessary to provide for the regeneration of one softener while another is supplying soft water to a service system, the two being in service alternately, the softener in service will require a much larger volume of water to complete its capacity run than is required to regenerate the other softener, and in order that the softener being regenerated does not have its meter and valve come to rest as soon as the second rinse is completed, we have provided the prolonged drainage of a small amount of hard water per hour from the meter through the master control valve, so that the softener being regenerated will be thrown into service at or about the time that the other softener is taken out of service automatically by its meter operating the valve thereof to start regeneration. Then, while that regeneration is going on, the previously regenerated softener is in service and remains in service until the other softener which is just being regenerated completes its regeneration and is finally thrown back into service again, and so on.

While we have shown in Figs. 1 and 7 single piston type valves, we do not limit our invention to such a construction, but, as shown in Figs. 14 and 15, we may combine two or more of the valves into multi-port piston type valves to reduce the number of pipe connections and generally simplify the installation. The valve shown at 107 takes the place of valves 39 and 42 of Fig. 7. With such a construction, only one of the two ports 72 and 75 is required and the other can be dispensed with, and during backwash when the port 72 or 75 registers with the rotor port 88, the valve 107 will be opened while the other valves are closed, thus allowing incoming raw water to flow through one portion of valve 107 into the bottom of the softener 31 and flow upwardly therethrough and out from the top thereof through the other portion of the valve 107 to the drain. The construction of the valve 107 is better illustrated in Fig. 15 in which 50a and 50b designate the annular grooves in the piston 48a of the valve which are arranged simultaneously to be brought into registration with the pipe connections on the body 108 when water under pressure is delivered to the valve to move the piston against action of the return spring 49a. While we have shown only one multi-port valve of a type which is normally closed but arranged to be opened under pressure, it should be understood that we may employ a plurality of valves and may employ one or more of a type which is normally open and arranged to be closed under pressure.

Fig. 6 illustrates electrical signaling means for indicating the degree of exhaustion of a softener or filter or the stage of regeneration thereof. At 102a is indicated a disk similar to one of the disks 102 shown in Fig. 4 carrying a series of circumferentially spaced contacts 109 and two other interconnected contacts 110 and 111. A wiper 112 engages these contacts and turns with shaft 35. A certain number of the contacts 109, four in this case, are connected with electric lights 113—116 to cause the illumination of first one and then another of the lights in order as the wiper 112 is turned progressively in one direction during the softening period. Assuming there are four lights, as shown, they may be designated 25%, 50%, 75% and 100%, in reference to the stage of exhaustion of the softener. The other four contacts 109 are connected to other electric lights 117—120 which indicate the progress of the regeneration cycle; the light 117, for example, indicating first backwash; the light 118, second backwash; the light 119, brining, and the light 120, rinsing. The other two contacts 110 and 111 are provided for sounding the alarm 121 at the end of the softening period and at the end of the regeneration cycle. As a substitute for the electric light signal means 113—120, or in addition thereto, we may employ electric lights 113'—116' for indicating the stages of exhaustion of the softener during the capacity run and other electric lights 117'—120' to indicate the stages of regeneration. It is also contemplated to provide either electric lights or annunciator coils and drops or to provide an electric motor which will be periodically energized as contacts are engaged in the rotation of the wiper 112 to rotate a pointer means to indicate the states of exhaustion of the softener or filter and also the progress of regeneration.

Referring to Figs. 16 to 22, we have illustrated a filter 31a having pipes 54a and 55a extending to the top and bottom thereof to conduct water into the top of the filter for passage downwardly through the filter bed, the filtered water discharged from the bottom of the filter being then conducted to a service system communicating with the pipe 56a. 34a designates the raw water supply pipe and 57a, 57b, 57c and 57d the drain pipes. At 46a is indicated a branch off the supply pipe 34a leading to the master control valve 37a which is housed in one end of the tubular body 122 of a multi-port valve 123. The latter is of the controlled reciprocation type and has a reciprocable piston type valve member 48b normally held in one extreme position by a coiled compression spring 49b, as shown in Figs. 16 and 18, but arranged to be moved to another extreme position against the action of said spring under hydraulic pressure of water discharged through the rotor 36a of the valve 37a into the body 122 through a port 124, the end of the valve member 48b being recessed, as at 52, to expose an enlarged area on the end of the valve member to the hydraulic pressure. The port 124 referred to is provided in a wall 125 suitably rigid with the end of the body 122 in snug relation to the bottom face of the rotor 36a. The latter is shown as provided with a manually operable handle 126 fixed to the stem 35a thereof and having a pointer 127 movable with respect to suitable markings on the closure plug 128 to indicate the positions of adjustment of the valve rotor 36a. However, it will be understood that we may operate the rotor 36a from a meter similarly as shown in Fig. 1. The rotor 36a has an arcuate groove 129 in the periphery thereof in the same plane with ports 130 and 131 in the body 122. The rotor has intercommunicating radial grooves 132 and 133 in the bottom thereof communicating at their inner ends with the port 124 in the wall 125 and arranged to communicate at their outer ends with ports 134 and 135 in the body 122. The port 135 has an extension 135' which permits establishing communication with the arcuate groove 129, as shown in Figs. 21 and 22. The pipe 46a, previously mentioned, delivers water under pressure to the port 135, and when the rotor 36a is in the position shown in Fig. 22, water is delivered under pressure through the arcuate groove 129 to the pipe 47a communicating with port 130, whereby to move the piston type valve member 48c provided in the tubular body 136 of another multi-port valve 137. This valve is of the same type as valve 123 and its piston type valve member likewise has a spring 49c which normally holds it in one extreme position, as shown in Figs. 16 and 17, but when water is delivered under pressure to the opposite recessed end 52, the valve member goes to the position shown in Fig. 18.

In operation, during the capacity run, the rotor 36a of the master control valve 37a is in the position shown in Figs. 16, 19, and 20 with the port 135—135' shut off and with the groove 132 establishing communication between the port 124 and the drain pipe 57c, so that the spring 49b holds the valve member 48b in the position shown. The valve member 48c is likewise held in an extreme position by the spring 49c, there being no pressure active against the valve member. The incoming raw water from the supply pipe 34a is admitted to the annular groove 138 in the valve member 48b with which the pipe 54a leading to the top of the filter tank 31a communicates, so that raw water is delivered into the top of the filter tank for passage downwardly through the filter bed. Filtered water leaving the bottom of the filter tank 31a through pipe 55a is delivered through the annular groove 139 in the valve member 48c through pipe 140 into annular groove 141 in the valve member 48b with which the service pipe 56a communicates, so that the filtered water is delivered to the service system. When a predetermined amount of water has been passed through the filter and it requires regeneration, the master control valve 37a will be operated by means of the handle 126 in the case of a hand controlled filter, or by the meter in the case of an automatically controlled filter, similarly as in the case of the automatically controlled master valve 7 of Fig. 1. The rotor 36a is turned through 180° to the position shown in Fig. 21, so that water under pressure is delivered through pipe 46a and groove 132 to the port 124 to force the valve member 48b against the action of the spring 49b to the opposite extreme position shown in Fig. 17. The filter 31a with the valves 37a, 123 and 137 in this new relationship is back-washed as follows: The incoming raw water from the supply pipe 34a enters the annular groove 138 in the valve member 48b and passes through pipe 140 which communicates therewith through the annular groove 139 in valve member 48c and through pipe 55a into the bottom of the filter tank 31a for passage upwardly through the filter bed. The scum and sediment deposited on top of the bed during filtering is washed out with the water discharged through pipe 54a from the top of the tank, the water finding its way from pipe 54a to the drain pipe 57b through the annular groove 142 in the valve member 48b, as clearly appears in Fig. 17. After a predetermined amount of water has been passed through the filter sufficient to thoroughly cleanse the filter bed, the rotor 36a of the master valve 37a is turned through 45° from the position of Fig. 21 to that of Fig. 22 for what is termed the rinse operation, the primary function of which is to clear out from the bottom of the filter all unfiltered water which entered during backwashing. When the rotor 36a is brought to the position shown in Fig. 22, the groove 133 establishes communication between port 124 and port 134 with which the drain pipe 57c communicates, so that pressure holding the valve member 48b in the position of Fig. 17 is relieved and it accordingly moves back to the normal position under the action of its spring 49b, as shown in Fig. 18. In this new position of the rotor 36a, the arcuate groove 129 also establishes communication between the pipes 46a and 47a, as shown in Fig. 22, so that water under pressure is delivered to the valve 137 to move the valve member 48c against the action of its spring 49c to the position shown in Fig. 18. Under these conditions, the incoming raw water from pipe 34a passes through annular groove 138 in the valve member 48b and through pipe 54a into the top of the filter tank 31a for passage downwardly through the filter bed. Filtered water displaces the unfiltered water beneath the filter bed and it is discharged through the pipe 55a through annular groove 139 in the valve member 48c and through drain pipe 57a to the sewer or other waste receptacle. After a predetermined amount of water has been passed through the filter 31a, sufficiently to thoroughly rinse out all unfiltered water, the rotor 36a of the master valve 37a is turned clockwise through approximately 45° from the position shown in Fig. 22 and then clockwise about 90° farther to that shown in Figs. 19 and 20 which is the position for normal filtering operation. In the 45° movement of the rotor 36a, the arcuate groove 129 establishes communication between pipes 47a and 57d to relieve the pressure-holding valve member 48c in the position shown in Fig. 18, allowing the valve member to be returned to the normal position under the action of its spring 49c, as shown in Fig. 16. In passing, attention is called to the guide pin 143 carried on the closure plug 144 and having a sliding working fit in an axial hole 145 provided therefor in the valve member 48c. This guide pin is preferably of square cross-section and the hole 145 therefor is also square so as to keep the valve member 48c from turning. In that way, the boss 139' provided on one side of the annular groove 139 and arranged to close off communication between the groove 139 and the drain pipe 57a in the normal position of the valve member 48c, is kept in the proper relationship to the port communicating with the pipe 57a so that the pipe 57a will not come into communication with the groove 139 except in the rinse position of the master control valve 37a, shown in Fig. 18.

In Figs. 23 to 26, we have shown the application of a somewhat similar pair of multi-port controlled reciprocation type valves 123a and 137a in combination with a master control valve 37b for controlling the operation of a base-exchange water softener 31b, the same having a brine tank 32b in connection therewith. In this combination, the master control valve 37b may have the rotor 36b thereof turned manually from one position to another similarly as the master control valve 37a is operated in Figs. 16 to 18, or the same may be turned by the meter measuring the flow of water through the softener, similarly as in the case of the master control valve 37 of Fig. 1. The valves 123a and 137a have piston type valve members 48d and 48e, respectively, normally held in one extreme position by springs 49d and 49e, respectively, but arranged to be moved to the opposite extreme position under hydraulic pressure. The valve member 48d has three annular grooves 143, 144 and 145, and an axial passage 146 interconnecting a diametrically extending passage 147 in one end of the valve member and a radial passage 148 in the other end. A spring closed check valve 149 controls communication between the diametrical passage 147 and the annular groove 143 and another spring closed check valve 150 controls communication between the radial passage 148 and the axial passage 146. The ejector nozzle 60b has a brine inlet pipe 152 and a discharge pipe 153 connected to the body of the valve 123a at longitudinally spaced points, and there is a valve 154 in the other branch controlling communication between the ejector and adjacent pipe 155 extending between the valves 123a and 137a. The guide pin 143a working in the hole 145a holds the valve member 48d against turning. The valve member 48e in the other valve 137a has three annular grooves 156, 157, and 158 provided therein. Two pipes 47b extend from the master control valve 37b, one to the valve 123a and the other to the valve 137a from ports 159 and 160 in the body of the master control valve. An arcuate slot 161 provided in the rotor 36b of the master control valve is arranged to be placed in communication with either of the ports 159 or 160, and when this slot registers with one of these ports, communication is established between the port and the atmospheric drain pipe 53b so that in the event the valve member 48d or 48e has been moved under hydraulic pressure, the turning of the rotor 36b to a position where the associated port 159 or 160, as the case may be, comes into register with the slot 161, the hydraulic pressure is immediately relieved and the valve member is permitted to return to normal position under the action of its spring 49d or 49e. The arcuate port 162 provided in the rotor 36b defined by the hollow boss 163 cast integral with the rotor 36b and communicating with the central pressure port 81b is on the same radius as the slot 161, so that water under pressure may be delivered from the pressure port 81b to either of the ports 159 or 160. The pressure port 81b, it is understood, will be supplied with water under pressure from the raw water supply pipe 34b, the same being here illustrated as having a branch pipe 46b extending therefrom for that purpose.

In operation, during softening, which is illustrated in Fig. 23, the rotor 36b of the master control valve 37b is in the position shown, with both valve members 48d and 48e held in one extreme position under the action of their springs 49d and 49e, respectively. The incoming raw water from supply pipe 34b is conducted through the annular groove 157 in the valve member 48e and through pipe 164 into annular groove 143 in valve member 48d from which point the pipe 54b communicating with the top of the softener tank 31b conducts the water into the top of the softener for passage downwardly through the bed of water softening material. The outgoing softened water is conducted from the bottom of the softener 31b through pipe 55b into annular groove 145 in valve member 48d and through pipe 155 into annular groove 158 in valve member 48e and out to the service system through pipe 56b. This flow continues until a predetermined amount of water has been passed through the softener, as indicated by the meter in the line, or as indicated by the condition of the water going to the service system. In the case of a meter controlled master valve, the meter automatically moves the valve rotor 36b to a position corresponding to the commencement of regeneration at the end of the capacity run, but in the case of a manually controlled softener, the rotor 36b will be turned by hand to the backwash position shown in Fig. 24. In the backwash position of the master control valve 37b, the rotor 36b establishes communication through the port 162 between the pressure port 81b and the port 160, whereby to deliver water under pressure to the valve 137a to move the valve member 48e against the action of its spring 49e to the position shown in Fig. 24. The valve member 48d of the other valve 123a remains in its normal position. The backwash flow is as follows: Raw water from the supply pipe 34b passes through annular groove 157, pipe 155, annular groove 145 and pipe 55b into the bottom of the softener tank 31b for passage upwardly through the bed of water softening material, so as to wash out from the top of the tank all accumulated scum and sediment deposited on top of the bed during softening, and also to break up the bed so that it will be in a better condition for regeneration. The waste water leaving the top of the tank through pipe 54b is conducted through groove 143, pipe 164 and groove 156 to the drain pipe 57e which conducts the waste water to the sewer or other waste receptacle. The backwash flow continues until a predetermined amount of water has passed through the softener tank, at which time, if the master control valve 37b is manually operated, the rotor 36b is turned to the brining position shown in Fig. 25. On the other hand, if this valve is operated by the meter, the meter at the end of the backwash flow causes the valve to establish communication between the port 162 and port 159 so that water under pressure is delivered from port 81b to the valve 123a at the proper interval to move the valve member 48d against the resistance of the spring 49d to the position shown in Fig. 25. The valve member 48e of valve 137a meanwhile remains in the moved position, due to the fact that the port 160 in this position of the rotor 36b is still in communication with port 162. The flow during brining is as follows: Raw water from supply pipe 34b is conducted through groove 157, both directly to the service system through pipe 56b and through the pipe 155 leading to the softener 31b. That which flows through the pipe 155 is conducted through valve 154 and through the ejector nozzle 60b, pipe 152, groove 143 and pipe 54b into the top of the softener tank 31b. The suction developed at the ejector nozzle 60b causes brine to be drawn from the brine tank 32b, through pipe 62b, through groove 144 and pipe 152 into the ejector nozzle 60b to mix with the water flowing therethrough, so that a properly proportioned mixture of brine and water is delivered into the top of the softener tank 31b for passage downwardly through the bed of water softening material to regenerate the same. The spent brine leaving the bottom of the softener through pipe 55b is conducted through groove 145 and drain pipe 165 to the sewer or other waste receptacle. A check valve 166 in the brine line allows flow of brine in the direction described, but closes in the event of flow in the opposite direction, whereas another check valve 167 in the refill pipe 63b allows flow only in the opposite direction to that just mentioned, whereby to permit replenishing the water supply in the brine tank 32b during the rinsing operation next described. The brining flow continues until a predetermined amount of water has been passed through the softener or until a predetermined amount of brine has been withdrawn from the brine tank. In case the master control valve 37b is hand operated, it is turned from the brining position of Fig. 25 to the rinsing position of Fig. 26 as soon as the level of brine in the brine tank 32b has dropped a predetermined distance, whereas in case the master control valve 37b is meter operated, the meter indirectly measures the amount of brine used by measuring the water flow which entrains the brine with it. In either event, as soon as the port 162 no longer communicates with port 160, but the latter is placed in communication with port 161 so as to relieve the pressure in valve 137a so that the valve member 48e is free to return to normal position under the action of its spring 49e, the following flow is established for rinsing: Raw water delivered from the supply pipe 34b is conducted through groove 157 and pipe 164 into the passage 147 in valve member 48d of valve 123a. Some of the water is bypassed to the service pipe 56b, through passage 146, past valve 150 and through passage 148 and branch pipe 168 to pipe 155 and thence through groove 158 to the service pipe 56b. The main flow for rinsing is from passage 147, past valve 149, into groove 143, and directly through pipe 54b into the top of the softener tank 31b for passage downwardly through the bed of water softening material to rinse out the remaining brine and liberated calcium and magnesium. The waste water leaving the bottom of the softener through pipe 55b is conducted through groove 145 to the drain pipe 165. At the commencement of the rinse operation, some of the water delivered to the groove 143 will find its way through pipe 153 to the ejector nozzle 60b, and thence through pipe 152 and groove 144 to the pipe 62b leading to the brine tank 32b. Check valve 166 prevents flow therethrough, but check valve 167 permits flow through the refill pipe 63b and float operated valve 64b into the brine tank 32b. The float closes the valve 64b when a predetermined level is reached. The rinse flow is continued until a predetermined amount of water has passed through the softener 31b, whereupon if the master control valve 37b is manually operated, it is turned by hand to the softening position shown in Fig. 23, whereas in the event the rotor 36b thereof is operated by the meter, the rinse flow is discontinued and softening operation resumed when the port 161 comes into communication with port 159 so as to relieve the pressure from valve 123a and allow the valve member 48d to be returned under the action of its spring 49d to the normal position shown in Fig. 23.

In Figs. 27 to 30, we have shown a generally similar combination of master control valve 37c and subordinate multi-port valves 123b and 137b to control the operation of the water softener 31c which has associated therewith a brine tank 32c. This combination has the master control valve 37c identical with master control valve 37b and a multiport valve 137b substantially identical with valve 137a, but the multiport valve 123b differs from the valve 123a in the elimination of the longitudinal passage 146 and the elimination of the check valves 149 and 150, there being substituted another check valve 169 in a connecting passage 153b between the valves 123b and 137b, the latter passage having communication with the passage 164a between said valves as well as with another passage 153a. All parts in Figs. 27 to 30 which correspond to parts in Figs. 23 to 26 have been numbered correspondingly. Inasmuch as the construction is so closely similar to that just described, it can doubtlessly be understood sufficiently from the description of the operation alone, which is as follows:

During softening operation, illustrated in Fig. 27, the incoming raw water from pipe 34c goes through groove 157 in valve member 48g and pipe 164a, through groove 143 in valve member 48f, through pipe 54c, into the top of the softener 31c for passage downwardly through the bed of water softening material. Softened water leaving the bottom of the softener tank is conducted through pipe 55c, groove 145, and pipe 155a into groove 158 and thence to the service system through pipe 56c.

During backwash operation, illustrated in Fig. 28, valve member 48g is moved under pressure to the position shown against the action of its spring 49g so that the incoming raw water from pipe 34c is conducted through groove 157 to pipe 155a and through groove 145 and pipe 55c into the bottom of the softener tank 31c for passage upwardly through the top of the bed of water softening material. The outgoing water carrying with it scum and sediment from off the top of the bed of water softening material is conducted through pipe 54c and groove 143, through pipe 164a, and groove 156 to the drain pipe 57f.

During brining operation, illustrated in Fig. 29, in which the valve member 48f of the valve 123b, is also moved under pressure against the action of its spring 49f like the valve member 48g of valve 137b, the flow is as follows: The incoming raw water from pipe 34c flows through groove 157 and pipe 155a, through valve 154a, ejector nozzle 60c, and pipe 153a into pipe 153b communicating with groove 143, whereby to conduct water through pipe 54c into the top of the softener tank 31c to cause a flow of brine mixture downwardly through the bed of water softening material. Brine for this purpose is conducted from the brine tank 32c, through pipe 62c, into groove 164, and thence through pipe 152a to the ejector nozzle 60c, at which point the brine mixes with the water flowing through the nozzle. Spent brine leaving the bottom of the softener tank 31c through pipe 55c is conducted through groove 145 to the drain through pipe 165a. A check valve 169 in the pipe 153b prevents flow to the pipe 164a communicating with the drain pipe 57f. However, during the brining operation, and likewise during the backwash operation (Fig. 28), it is clear that the service pipe 56c is in direct communication through groove 157 with the raw water supply pipe 34c, so that water may be drawn at any service tap during the course of both of these operations.

During rinsing operation, which is illustrated in Fig. 30, in which the valve member 48g of valve 137b is permitted to return to normal position under the action of its spring 49g by reason of the rotor 36c of the master control valve 37c having moved to a position in which pressure on the valve member 48g is relieved through pipe 53c, the following flow is established: The incoming raw water from supply pipe 34c passes through groove 157, through pipe 153b, into groove 143, and thence through pipe 54c into the top of the softener tank 31c for flow downwardly through the bed of water softening material. The waste water leaving the bottom of the softener tank 31c through pipe 55c is conducted through groove 145 to the drain pipe 165a. During this operation, some of the incoming raw water is used to refill the brine tank 32c as indicated by the arrows, the flow being shut off by the float valve 64c when the proper level is obtained, similarly as in the form last described.

It is believed the foregoing description conveys a good understanding of the objects and advantages of our invention. The appended claims have been drawn with a view to covering all legitimate modifications and adaptations.

We claim:

1. In a water treating apparatus, the combination of a container for water treating material, a source of raw water supply under pressure, means for subjecting said material to treatment phases, such as softening, back-washing, regeneration, and rinsing, including a piping system for conveying water from said source through said container, a plurality of spring pressed valves in said system for controlling the flow of water therethrough for effecting said phases, each of said valves being operated in one direction under spring pressure and adapted to be operated in the opposite direction under pressure from said source of raw water, a plurality of pressure tubes one of which is connected to each of said valves for water pressure operation thereof, said valves being operative to allow or stop flow of water therethrough in accordance with a predetermined pressure in said tubes sufficient to overcome the pressure of the springs associated with the respective valves, a single rotary master valve connected to said tubes for selectively admitting and allowing the escape of water from said tubes to control the pressure therein in a predetermined sequence in the continuous rotation of said master valve, whereby to effect the phases in a predetermined sequence and timed relationship, means measuring the flow of water from the source of raw water operatively connected to cause the continuous rotation of said master valve, said means comprising low ratio and high ratio register gears adapted for selectively transmitting drive to said master valve, electro-magnetic clutches controlling the driving connections between said register gears and said master valve, a source of electric current supply, and a timing disk means operatively connected to turn with the master valve and operatively connected to control the energization of said electro-magnetic clutches so that the master valve is operated by the low ratio register gearing during the treating period and by the high ratio register gearing during the regeneration period.

2. An automatic water treating apparatus comprising, in combination, a container for water treating material, means for delivering raw water thereto and conducting treated water therefrom, a meter for measuring the raw water delivered, ejector means operable with water from the raw water delivery means for delivering regenerating material to said container from a source of supply of regenerating material, a plurality of mutually independent hydrostatically operable valves for controlling the flow of water and regenerating material through said container to place the apparatus in treating position or a regenerating position, a master control valve comprising a casing, a multiported stator element, one of said casing and stator elements having a hydrostatic pressure port provided therein and the other having a relief port provided therein, and a multiported rotor element arranged to turn with respect to the multiported stator element to establish communication selectively between a certain port or ports in the stator and said hydrostatic pressure port or said relief port, separate and independent hydrostatic pipe connections between the stator ports and the aforesaid valves, a pipe connection between the hydrostatic pressure port and the means for delivering raw water to said container, the aforesaid meter comprising low ratio and high ratio register gears for selectively transmitting drive to said rotor element, the one set of register gears being normally connected and the other disconnected from the rotor element, electro-magnetic clutches controlling the driving connections between said register gears and said rotor element, and a timing disk means turning with the rotor element and serving to control the energization of said electro-magnetic clutch means from a source of electric current supply, so that the rotor element is operated by the low ratio register gear during the treating period and from the high ration register gear during the regeneration period.

3. An automatic water treating apparatus, comprising, in combination, a container for water treating material, means for delivering raw water thereto and conducting treated water therefrom, a meter for measuring the water flow through said container, ejector means operable with water from the raw water delivery means for delivering regenerating material to said container from a source of supply of regenerating material, a plurality of mutually independent hydrostatically operable valves for controlling the flow of water and regenerating material through said container to place the apparatus in treating position or a regenerating position, each of said hydrostatically operable valves comprising a hollow valve body providing a bore therein in transverse relation to inlet and outlet ports provided in opposite sides of the body in registering relation, a valve piston reciprocable in the bore and so formed that when moved to one extreme position it closes the valve ports and when moved to the opposite extreme position it opens the valve ports, and spring means in one end of the bore normally urging the valve piston toward one extreme position, the valve body having a pressure port at the opposite end of the bore to admit water under pressure for operation of the valve piston to its opposite extreme position against the action of said spring means, a single rotary master control valve comprising a casing, a multiported stator element, one of said casing and stator elements having a hydrostatic pressure port provided therein and the other having a relief port provided therein, and a multiported rotor element arranged to turn with respect to the multiported stator element to establish communication selectively between a certain port or ports in the stator and said hydrostatic pressure port or said relief port, separate and independent hydrostatic pipe connections between the stator ports and the pressure ports of the aforesaid valves, a pipe connection between the hydrostatic pressure port and the means for delivering raw water to said container, and means providing operating connections between the aforesaid meter and said rotor element to cause continuous rotation of the latter in the operation of the apparatus.

4. An apparatus as set forth in claim 3, wherein the last mentioned means comprises low ratio and high ratio register gears for selectively transmitting drive to said rotor element, clutches controlling the driving connections between said register gears and said rotor element, and timing means operatively connected to turn with the rotor element and operatively connected to control the engagement and disengagement of said clutches so that the rotor element is operated by the low ratio register gearing during softening and by the high ratio register gearing during regeneration.

5. An automatic water treating apparatus comprising, in combination, a container for water treating material, means for delivering raw water thereto and conducting treated water therefrom, a meter for measuring the raw water delivered, ejector means operable with water from the raw water delivery means for delivering regenerating material to said container from a source of supply of regenerating material, a plurality of mutually independent hydrostatically operable valves for controlling the flow of water and regenerating material through said container to place the apparatus in treating position or a regenerating position, a master control valve comprising a casing, a multiported stator element, one of said casing and stator element having a hydrostatic pressure port provided therein and the other having a relief port provided therein, and a multiported rotor element arranged to turn with respect to the multiported stator element to establish communication selectively between a certain port or ports in the stator and said hydrostatic pressure port or said relief port, separate and independent hydrostatic pipe connections between the stator ports and the aforesaid valves, a pipe connection between the hydrostatic pressure port and the means for delivering raw water to said container, the aforesaid meter comprising low ratio and high ratio register gears for selectively transmitting drive to said rotor element, the one set of register gears being normally connected and the other disconnected from the rotor element, clutches controlling the driving connections between said register gears and said rotor element, and timing means turning with the rotor element and serving to control the engagement and disengagement of said clutch means, so that the rotor element is operated by the low ratio register gear during the treating period and from the high ratio register gear during the regeneration period.

CHESTER T. McGILL.
OMAR FRED DUBRUIEL.